J. S. McKEE & J. F. SCHNABEL.
SAFETY DYNAMIC BRAKING SYSTEM FOR HOISTS.
APPLICATION FILED JAN. 8, 1909.
982,284.
Patented Jan. 24, 1911.
3 SHEETS—SHEET 1.
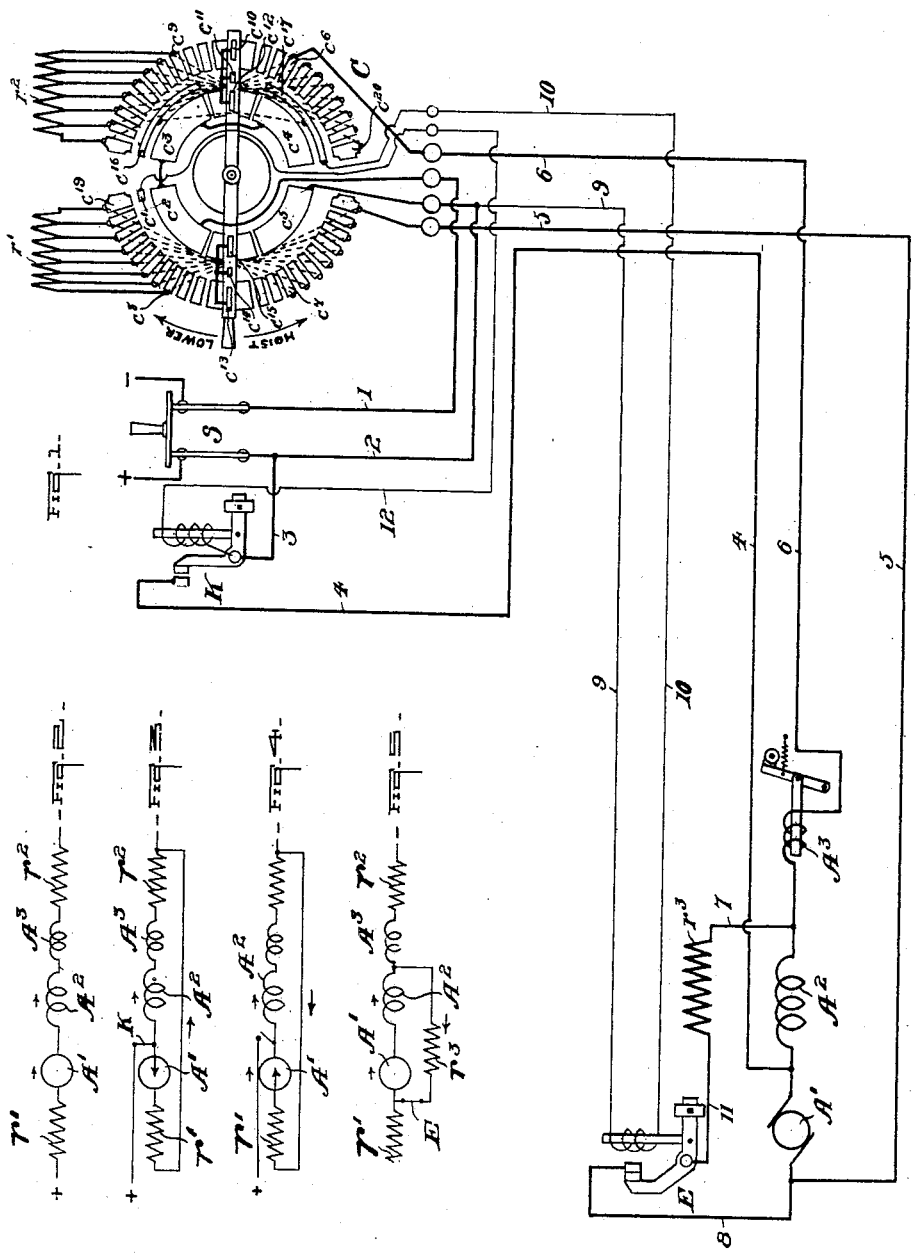

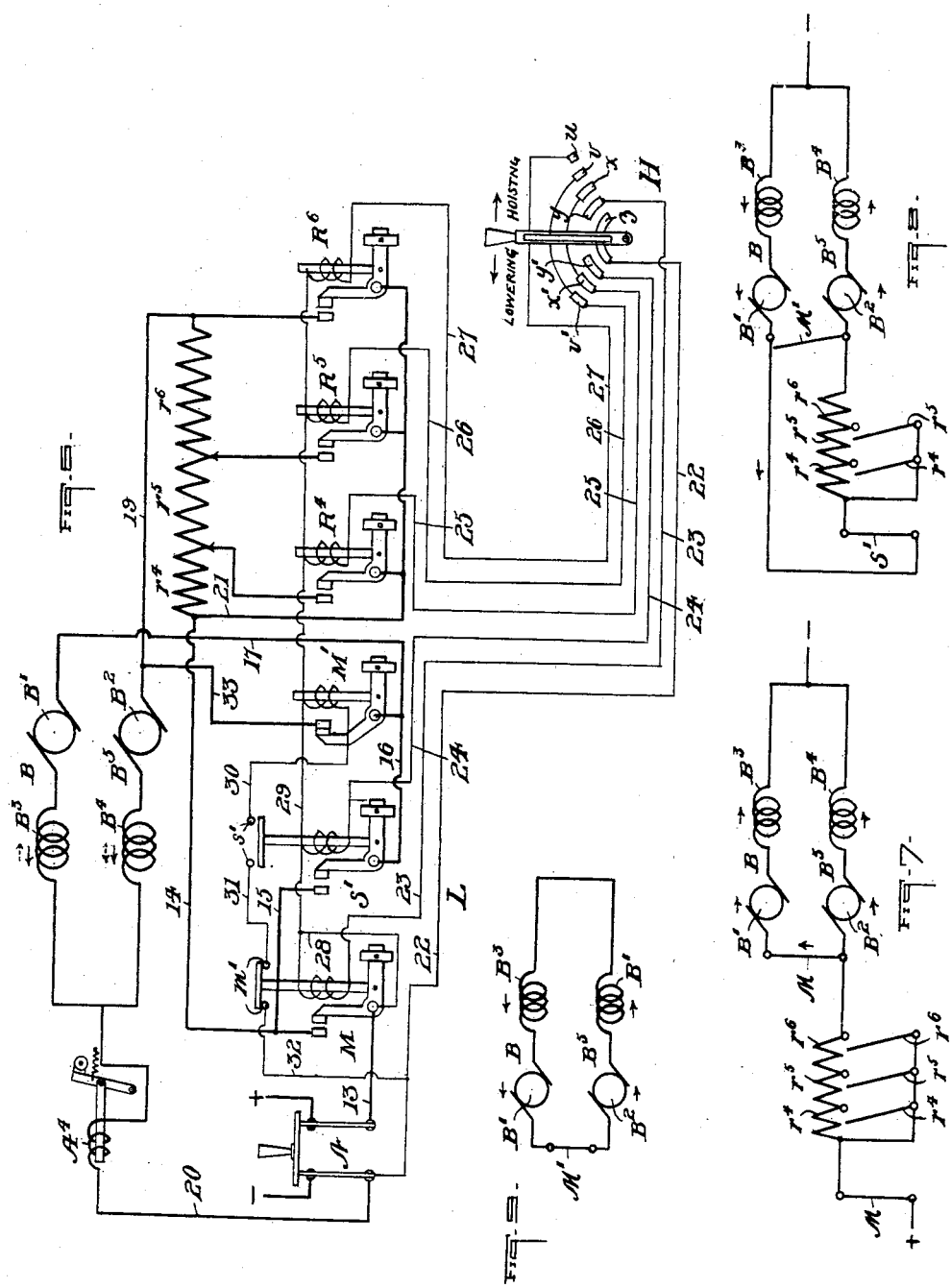

J. S. McKEE & J. F. SCHNABEL.
SAFETY DYNAMIC BRAKING SYSTEM FOR HOISTS.
APPLICATION FILED JAN. 8, 1909.
982,284.
Patented Jan. 24, 1911.
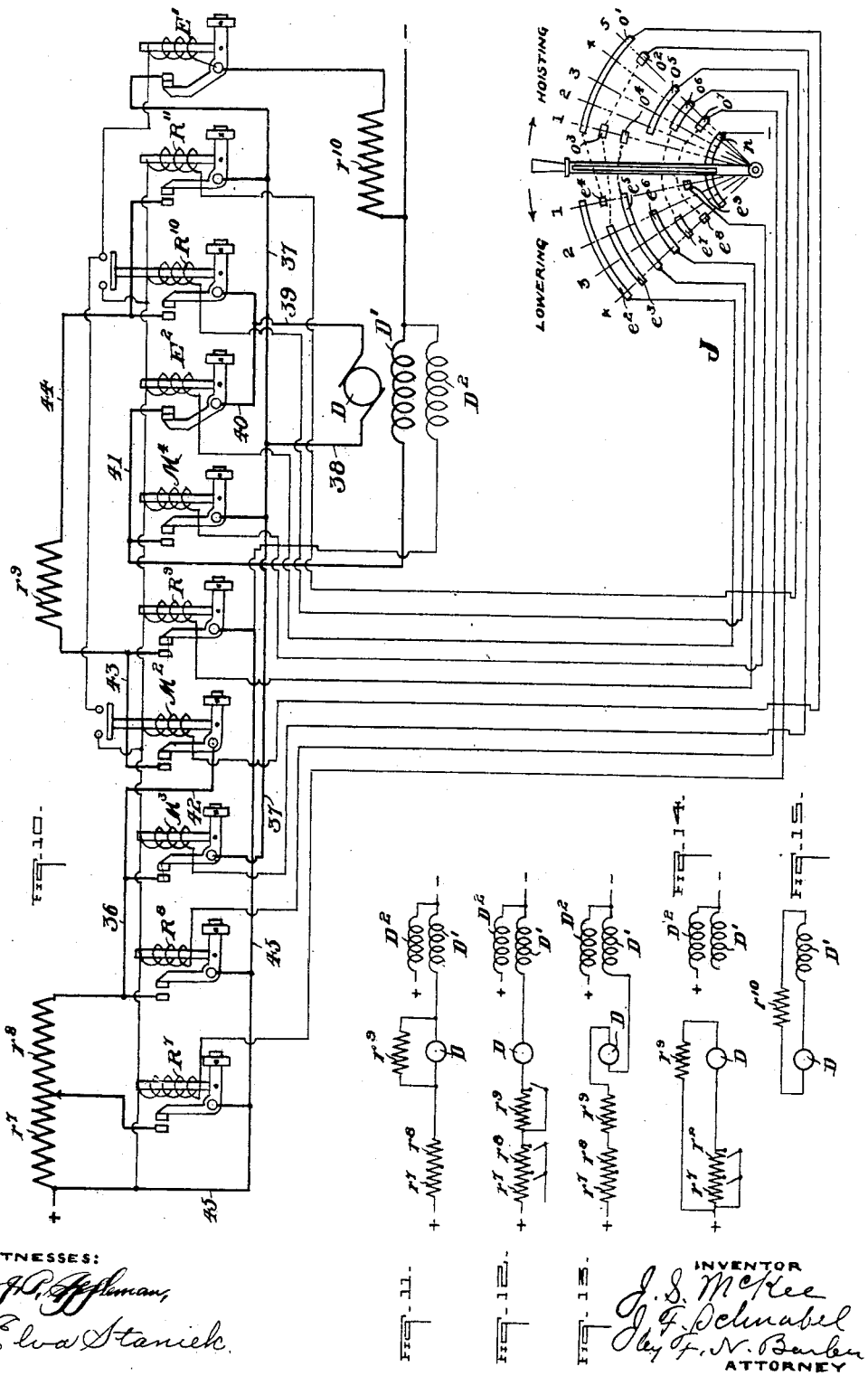

UNITED STATES PATENT OFFICE.

JOHN S. McKEE, OF PITTSBURG, PENNSYLVANIA, AND JAMES F. SCHNABEL, OF NEW YORK, N. Y.

SAFETY DYNAMIC BRAKING SYSTEM FOR HOISTS.

982,284.    Specification of Letters Patent.    Patented Jan. 24, 1911.

Application filed January 8, 1909. Serial No. 471,276.

*To all whom it may concern:*

Be it known that we, JOHN S. MCKEE and JAMES F. SCHNABEL, citizens of the United States, residing at Pittsburg, county of Allegheny, and State of Pennsylvania, and at New York, county and State of New York, respectively, have invented or discovered new and useful Improvements in Safety Dynamic Braking Systems for Hoists, of which the following is a specification.

Our invention relates to the use of a mechanically closed safety dynamic braking switch in connection with systems for controlling the speed of an electric motor or motors used for hoisting or lowering loads, with provision for automatically retarding the speed in lowering and preventing the racing of motors should the current or controller connections fail. This is a most desirable addition to controllers for operating unbalanced hoists, such as car dumpers, cranes or hoists without mechanical brakes, the hoist motion of ore unloaders and ore bridges, etc.

One of the objects of our invention is to secure protection from too high speed in lowering in case the line voltage fails, or the line voltage becomes so low as to be insufficient to close the power switches, or the normal dynamic braking switches, or the windings of the main and normal dynamic braking switches, or the control-circuit connections fail.

With a very low resistance in circuit with the motor and the safety switch, that is, with the motor almost short circuited, the load will move downwardly at an extremely slow speed which will prevent in most cases serious damage. It is understood that a mechanical brake should be provided if the load is to be held in any desired position for any length of time. A shunt-wound magnetically-operated friction brake will give protection against failure of the line voltage only; a series wound brake affords protection against failure of voltage or failure of any of the circuits and is to be recommended on hoists of traveling cranes where trolley wires and movable contacts must be employed. Our invention, however, will prevent a dangerous speed in lowering even if the power fails or the circuit becomes opened or if the brake becomes for any reason inoperative.

Referring to the accompanying drawings, Figure 1 is a diagrammatic representation of one form of our invention showing among other things a series-wound motor in connection with a series-wound brake; Fig. 2, a simplified diagram of the motor circuit when the controller is at the first hoisting position; Fig. 3, a simplified diagram of the motor connection when the load is being lowered and the controller arm has the contact $C^{14}$ on the contact $C'$; Fig. 4, a like diagram but with the controller arm moved off from the contact $C'$ to set up a closed dynamic braking circuit; Fig. 5, a simplified diagram of the emergency braking circuit; Fig. 6, a diagram showing a second form of our invention wherein we use two series-wound motors, the braking current being initiated from the difference between armature E. M. F.'s of the two motors; Fig. 7, a simplified diagram showing the motor connections at the first hoisting position; Fig. 8, a similar diagram showing the motor connections for the first lowering position; Fig. 9, a diagram of the motor connections for emergency braking; Fig. 10, a diagrammatic view of a third form of our invention showing a compound-wound motor; Figs. 11 and 12, simplified diagrams of the motor connections when the controller is at the first and second hoisting steps; Figs. 13 and 14, similar diagrams showing the connections when the controller is at the first and second lowering steps; and Fig. 15, a simplified diagram of the motor connections for emergency braking.

Referring first to Fig. 1, C is a manually-operated controller by which the resistances $r'$ and $r^2$ are inserted in series with the motor in starting and gradually cut out manually during acceleration. K is a magnetically-operated switch used to start the motor in the reverse direction and release the series-wound brake $A^3$. E is a magnetically-actuated safety switch and $r^3$ is a very low resistance; these being placed preferably near the motor so that connecting wires 7, 11, and 8 may be as short as possible and their integrity maintained. For hoisting, the controller arm is moved to the contacts $C^9$ and $C^7$. Circuit is now established from the positive on the switch S, through the wire 2, the contact $C^5$, the finger $C^{15}$, the finger $C^{13}$, the contact $C^7$, the whole of the resistance $r'$, the wire 5, the armature $A'$, the series field $A^2$, the series brake $A^3$, the wire 6, the whole of the resistance $r^2$, the contact $C^9$, the fingers $C^{10}$ and $C^{12}$, the contacts $C^3$ and $C^2$, and the wire 1 to the negative on the switch S. This connection is shown simplified in Fig. 2. A circuit is also established from the positive on the switch S, through the wire 9, the operating coil of the switch E, the wire 10, the contacts $C^{17}$ and $C^{16}$, the fingers $C^{11}$ and $C^{12}$, the contacts $C^3$ and $C^2$, and the wire 1 to the negative on the switch S. This opens the safety switch E, removing the short circuit from the motor circuit. The motor now starts in the hoisting direction, and as the arm is moved toward the last contacts, the resistances $r'$ and $r^2$ are gradually cut out, causing the motor to increase its speed in the well-known manner.

When it is desired to stop the motor, the controller handle is moved to the off-position, at which time the current is cut off from the motor and the series brake $A^3$ holds the load from lowering. The switch E closes but no braking current is set up, the back E. M. F. being opposed to the previous field excitation. No braking is required, since the action of gravity on the rising load promptly stops it.

To lower the load, the controller handle is moved in the lowering direction until the contact $C'$ is reached. No current flows up to this point on account of the switch K being open, but when the fingers $C^{11}$ and $C^{12}$ connect the contacts $C^{17}$ and $C^4$, the operating coil of the switch E is energized, and this switch opens. As soon as the contact $C'$ is reached, a circuit is established as follows: from the positive on the switch S, through the wire 3, the operating coil of the switch K, the wire 12, the contact $C'$, the fingers $C^{14}$ and $C^{15}$, and the contact $C^2$ to the negative through wire 1. This closes the switch K, and the main motor circuit is established as follows: from the positive on the switch S, through the switch K, the wire 4, to a point between the armature and the field of the motor, where the current divides, part going through the armature in the reverse direction to that in the hoisting, the wire 5, the resistance $r'$, the contact $C^{19}$, the fingers $C^{13}$ and $C^{15}$, and the contact $C^2$ to the negative through the wire 1. The other part of the circuit is through the series field $A^2$ in the same direction as in hoisting, the series brake $A^3$, the wire 6, the resistance $r^2$, the contact $C^{20}$, the fingers $C^{10}$ and $C^{12}$, the contacts $C^4$, $C^3$, and $C^2$, and the wire 1 to the negative on the switch S. This circuit releases the series brake and starts the motor in the lowering direction, the connections being shown simplified in Fig. 3.

When the controller handle is moved from the contact $C'$ toward the off-position, the switch K opens, establishing the circuit as shown in Fig. 4. The motor then generates current, due to the overhauling of the load, keeping the series brake released and the load descends under the control of the dynamic braking, this braking circuit being controlled by the moving of the controller arm toward the off position, which gradually cuts out the resistance.

Whenever the handle of the controller is moved to the off-position or in the event of failure of voltage or on the occasion of low voltage or should the wires 1, 2, 9, and 10 become disconnected, the switch E will be deënergized and close, establishing a braking circuit through the motor and the resistance $r^3$, and the wires 7, 11, and 8. This circuit is shown simplified in Fig. 5.

Referring now to Fig. 6, L is a magnetic switch-controller, in which the switches M, $S'$, $R^4$, $R^5$, and $R^6$ are magnetically closed, and the switch $M'$ is magnetically opened. B and $B^5$ are two series-wound motors which operate in parallel during hoisting. If the handle of the master controller H is moved in the hoisting direction, as soon as contact is made with the contact $y$, the switch M is closed by the following circuit: from the positive on the switch N through the wire 13, the wire 28, the operating coil of the switch M, the wire 23, the contact $y$, the negative contact $z$ on the master controller, and the wire 22 to the negative side of the switch N. The motor circuit is now established from the positive on the switch N, through the switch M, all of the starting resistances $r^4$ to $r^6$, the wire 19, the motor $B^5$, and the wire 20 to the negative on the switch N; and also through the wire 33, the switch $M'$, the wire 17, the motor B, and the wire 20 to the negative on the switch N. This circuit starts the motors in the hoisting direction. The resistances $r^4$, $r^5$, and $r^6$ are cut out by the closure of the switches $R^4$, $R^5$, and $R^6$, as the master controller handle is moved to the contacts $x$, $v$, and $u$, which control these switches. The simplified diagram in Fig. 7 shows the connections during hoisting. If the master controller handle is moved to the off-position, the resistances $r^6$, $r^5$, and $r^4$, are gradually cut in, slowing down the motors. When the switch M is opened, the switch $M'$ remains closed by gravity and the connection of the motor is as shown in Fig. 9. The load tends to stop the motor quickly and no dynamic braking action takes place on account of the slow movement of the motors and also the back E. M. F. of the two motors being opposed to each other. It is supposed that the motors are equipped with brakes operated by foot power or any other well-known means, as the brake coil $A^4$, for holding the load in the hoisted position. If now it is desired to lower the load, the non-electric brakes if any are released and the controller handle is moved to the contact $y'$. This closes the switch $S'$, the circuit therefor being plain. As soon as the switch $S'$ closes its auxiliary contacts $s'$, a circuit is closed through the operating coil of the switch $M'$ as follows: from the positive on the switch N through the wire 13, the wires 28 and 29, the operating coil of the switch $M'$, the wire 30, the auxiliary contacts $s'$ of the switch $S'$, the wire 31, the auxiliary contacts $m'$ of the switch M, and the wire 32 to the negative main. This circuit opens the safety switch $M'$ and the motor circuit is as follows: from one terminal of the armature $B^2$, through its field $B^4$, the field $B^3$, the armature $B'$, the wires 17 and 16, the switch $S'$, the wires 15 and 14, all of the starting resistance, and the wire 19 to the other terminal of the armature $B^2$. We will suppose that the motor $B^5$, as it is operated by the load in lowering, generates a slightly higher E. M. F. than the motor B. Since the armature is revolving in the opposite direction to that while hoisting, the current will flow through its own field in the direction of the lower arrow and will flow through the field $B^3$ in the opposite direction to that while hoisting. This current, as soon as it becomes high enough to reverse the field $B^3$, will change the polarity of the motor B and the two motors will then tend to generate a current in the direction of the dotted arrows and over the path above described. The motors are now connected in series with each other and all of the starting resistance, as shown in the simplified diagram, Fig. 8. The switches $R^4$ and $R^5$ may be closed to regulate the speed of lowering by moving the controller handle to contacts $x'$ and $v'$. When it is desired to stop the motors, the controller handle is moved to the off-position, when the brake $A^4$ or other brake is applied to hold the load. In case of failure of voltage or of any disconnection of the control wires, the safety switch $M'$ becoming deënergized is allowed to close establishing a circuit with the two motors in series and without any resistance. The load would tend to lower, but the dynamic braking circuit is set up, as above explained, with the two motors in series and they will revolve at a slow speed until the load is entirely lowered. Fig. 9 shows a simplified diagram for this circuit.

In Fig. 10 we have shown a magnetic switch controller operating a compound-wound motor for a hoisting mechanism, in which it is desired to obtain a very slow speed on the first step, such for instance, as would be desired in taking up the slack cables on a hoist. The connections simplified are shown in Fig. 11 for this step.

In lowering, the motor is reversed on the first step, as shown in Fig. 13 with all of the resistance in circuit; and on the second step in lowering the power is cut off from the motor and it is arranged to lower the load by dynamic braking on the shunt field of the motor only. A safety switch $E^2$ is used in the normal operation of this circuit and we have shown an emergency switch $E'$ which is also a safety switch, which, upon the failure of voltage or on the occasion of low voltage or failure of the control wires, will close in conjunction with the switch $E^2$ and give the connections shown in Fig. 15, short-circuiting the motor and the series field through the resistance $r^{10}$, thereby allowing the motor to move slowly in the down direction. Brakes must be provided as before described under Fig. 7 to hold the load at any desired position.

Referring to Fig. 10, if the master controller handle is placed on step 1 in hoisting, the switches $M^2$, $M^3$, and $R^{10}$ are closed, being energized from the master controller, these circuits being easily traced. The safety switch $E^2$ remains closed, but the safety switch $E'$ is open on account of its solenoid being energized direct from the positive and negative mains, through the auxiliary contacts of the switch $M^2$ or the switch $R^{10}$. Upon the closure of the switches $M^2$, $M^3$, and $R^{10}$, the motor circuit is as follows: from the positive through the resistances $r^7$ and $r^8$, the wire 36, the switch $M^3$, the wires 37 and 38, the armature D, the wires 39 and 40, the switch $E^2$, the wire 41, and the field $D'$ to the negative. A circuit is also established through the resistance $r^9$, it being bridged across the terminals of the armature, through the wires 38 and 37, the switch $M^3$, the wire 42, the switch $M^2$, the wire 43, the resistance $r^9$, the wire 44, the switch $R^{10}$, and the wire 39 to the other side of the armature. The motor is now connected as shown in Fig. 11 and a very slow speed results, due to the resistance $r^9$ being shunted around the armature. On moving the controller handle to step 2, the switches $M^3$ and $R^{10}$ are opened and the switch $R^{11}$ is closed. This circuit changes the position of the resistance $r^9$, removing it as a shunt around the armature and placing it in series with the resistances $r^7$ and $r^8$. The circuit is as follows: from the positive, through the resistances $r^7$ and $r^8$, the wires 36 and 42, the switch $M^2$, the wire 43, the resistance $r^9$, the wire 44, the switch $R^{11}$, the wires 37 and 38, the armature D, the wire 39, the switch $E^2$, the wire 41 and the field $D'$ to the negative. This circuit is shown in Fig. 12. The steps 3, 4, and 5 on the master controller close the switches $R^7$, $R^8$, and $M^3$ respectively which cut out resistances $r^7$, $r^8$, and $r^9$, accelerating the motor and placing it across the line.

To stop the load, the master controller handle is moved to the off-position. To lower the load, the handle of the master controller is placed on the step 1 of the lowering position, whereupon the switches $E^2$, $M^2$, and $r^{10}$ and $M^4$ are energized. This circuit opens the switch $E^2$, and closes the other three, the switch $E'$ remaining open, because it is energized across the line through the auxiliary contacts of switches $M^2$ and $r^{10}$. This circuit connects the motor circuit as follows: from the positive through the resistances $r^7$ and $r^8$, the wires 36 and 42, the switch $M^2$, the wire 43, the resistance $r^9$, the wire 44, the switch $R^{10}$, the wire 39, the armature D, the wires 38 and 37, the switch $M^4$ and the field $D'$ to the negative. This circuit allows current to flow through the armature in the direction opposite to that from hoisting, causing the motor to start in the lowering direction, all of the resistance being in series. This connection simplified is shown in Fig. 13. As soon as the motor gets to fair speed, the controller handle is moved to position 2, whereupon the switches $M^2$ and $M^4$ are opened and the switches $M^3$ and $R^9$ are closed. The dynamic braking circuit thereby closed is as follows: from the terminal of the armature D through the wire 39, the switch $R^{10}$, the wire 44, the resistance $r^9$, the switch $R^9$, the wire 45, the resistances $r^7$ and $r^8$, the wire 36, the switch $M^3$, and the wires 37 and 38 to the other terminal of the armature D. The shunt field is still energized directly across the line and the dynamic braking circuit is maintained from shunt field excitation. The further movement of the controller handle to steps 3 and 4 closes the switches $R^7$ and $R^8$, which enables the operator to regulate the speed of the motor in lowering. A simplified diagram of this connection is shown in Fig. 14.

If during lowering the voltage fails or the voltage becomes so low that any of the operating switches should open, the switches $E^2$ and $E'$ close, connecting the armature of the motor and its series field winding in series with the resistance $r^{10}$ as shown in Fig. 15, allowing the load to descend slowly. If the brakes are in operating condition the operator can of course stop and hold a load at any point, but these safety switches take care of a condition in which the brakes might become inoperative, and so allow the load to descend at a slow enough speed to prevent any damage when it reaches its lowest position.

The several systems heretofore described are different combinations of motor or motors and resistances to which this scheme of spring or gravity closing switch can be applied to secure the several objects of our invention. There are others which could be used without departing from the spirit of the invention which embody the idea of using this style of switch for connecting a motor or motors in a circuit of the least allowable resistance, independent of other connections and resistances of the controller for the purposes described.

We claim—

1. In a control system for electric motors, a motor, contacts and connections for causing the motor to run in one direction, a magnetically-operated switch, contacts and connections including the winding of said switch for causing the motor to run in the opposite direction, resistance for controlling the motor in both directions of operation, an additional resistance, a second magnetically-operated switch arranged to be open when its winding is energized, means tending constantly to close the second switch when open, the contacts of the second switch being arranged to close a dynamic braking circuit including the armature and field of the motor and a low resistance.

2. In a control system for electric motors, a motor, contacts and connections for causing the motor to run in one direction, a magnetically-operated switch, contacts and connections including the winding of said switch for causing the motor to run in the opposite direction, a second magnetically-operated switch arranged to be open when its winding is energized, means tending constantly to close the second switch when open, said second switch when deënergized being connected to close substantially a short-circuit containing the armature and the field of the motor.

3. In a controller for electric motors, a motor, a switch having connection to include the motor in a dynamic braking circuit, a second dynamic braking circuit, a switch having contacts in the latter circuit and having connections whereby it is opened when the first switch closes its dynamic circuit, and closed when the first switch opens its said circuit or upon the dropping of the voltage in the circuit of the motor or of the second switch.

4. In a controller for electric motors, a motor, two dynamic braking circuits including the armature and field windings of the motor, a switch for each circuit, and means whereby one switch controls the other, so that when one is closed the other is open.

5. In a controller for electric motors, a motor, two dynamic braking circuits including the armature and field windings of the motor, a controller for one circuit, an electromagnetic switch for the other circuit, means for causing the first switch to control the electro-magnetic switch, and connections such as to cause each switch to be open when the other is closed.

6. In a controller for electric motors, a motor, a resistance, a controller having connections for varying the amount of said resistance in the motor circuit and for including said motor in a dynamic braking circuit with more or less of said resistance, a second dynamic braking circuit of relatively low resistance, an automatic switch controlled by the controller so as to be open when said first dynamic braking circuit is closed and constructed to close when the voltage in said motor, controller, or controlled circuit is below a predetermined minimum.

Signed by the said JOHN S. McKEE, at Cleveland, Ohio, this 29th day of December, 1908, and by the said JAMES F. SCHNABEL, at Cleveland, Ohio, this 29th day of December, 1908.

JOHN S. McKEE.
JAMES F. SCHNABEL.

Witnesses:
J. H. HALL,
H. M. DIEMER.